(12) United States Patent  
Smith

(10) Patent No.: US 7,802,887 B2  
(45) Date of Patent: Sep. 28, 2010

(54) SYSTEM AND METHOD FOR IMPROVED 3-D RENDERING IN 3-D RENDERING VOLUME

(75) Inventor: Lawrence C. Smith, Charlevoix, MI (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 11/737,316

(22) Filed: Apr. 19, 2007

(65) Prior Publication Data

US 2008/0259280 A1    Oct. 23, 2008

(51) Int. Cl.
*G03B 21/00* (2006.01)
*G03B 21/32* (2006.01)

(52) U.S. Cl. ............................................. 353/7; 352/86

(58) Field of Classification Search ................ 353/7–10, 353/46, 48, 51, 122, 30–31, 34, 82, 85; 348/42–60; 359/462–479; 349/15; 352/57, 85–90; 345/55, 345/108–111
See application file for complete search history.

(56) References Cited

U.S. PATENT DOCUMENTS 4,799,103 A  *  1/1989  Muckerheide ............... 348/51
5,793,918 A  *  8/1998  Hogan ......................... 385/116
2003/0020879 A1*  1/2003  Sonehara ....................... 353/7

* cited by examiner

*Primary Examiner*—Que T Le
*Assistant Examiner*—Jennifer Bennett
(74) *Attorney, Agent, or Firm*—Dillon & Yudell LLP

(57) ABSTRACT

A wiremap projector apparatus for projecting moving three-dimensional images within a three-dimensional viewing space. The wiremap projector apparatus includes an array of wires disposed within a three-dimensional viewing space defined between a first and second sheet. A digital projector is positioned with respect to said array of wires such that the projector projects multiple lighted pixel lines onto the array of wires to display a moving three-dimensional image within the three-dimensional viewing space. A position control actuator includes an actuating force means for moving the one or more wires, and a position controller generates and sends a position control signal to the position control actuator. The position controller generates the position control signal from image data processed by the projector to project multiple lighted pixel lines onto the array of wires to display a moving three-dimensional image within the three-dimensional viewing space.

5 Claims, 4 Drawing Sheets

SYSTEM AND METHOD FOR IMPROVED 3-D RENDERING IN 3-D RENDERING VOLUME

BACKGROUND OF THE INVENTION

1. Technical Field

The present invention relates generally to image projection systems that render images in a three-dimensional rendering volume. In particular, the invention relates to an apparatus, system, and method for rendering moving images in a wiremapped rendering volume.

2. Description of the Related Art

Despite the many advancements in rendering moving visual images, the vast majority rely on using two-dimensional rendering to simulate three-dimensional images. Shading, relative sizing and other visual effects are utilized on two-dimensional rendering display such as a flat projector screen for front or back side projection techniques to provide a visual representation that is interpreted by the human eye as three-dimensional information.

Several attempts have been made in the art to provide visual rendering of images that provides the "feel" as well as the "look" of a moving three-dimensional image. One such developing technology, sometimes referred to as wiremapping, utilizes an array of mutually parallel wires to provide the reflective media within a specified viewing volume. Three-dimensional wiremap projection is a method of projecting three-dimensional (3-D) images on an array of wires strung vertically and/or horizontally within a volume. A standard computer projector is used to generate 3-D projections by disbursing the image onto the wires within the volume so that the rendered image is a true 3-D image. Conventional wiremapped image rendering uses wires having a fixed position within the projection volume. In this manner, to project a moving object, the wiremap projector is programmed and positioned with respect to the static array of wires in a manner such that each of the projector "pixels" projects on a specified one of the respective wires. The static association of projector lines or pixels with wires requires that a particular reference point on a moving image shifts across projector pixels and hence across different wires in the rendering volumes. Such shifting of a image points between wires may results in image rendering discontinuities.

SUMMARY OF THE INVENTION

The present addresses a need in the art for a method, system, and computer program product for. The present invention addresses this and other needs unresolved by the prior art.

A wiremap projector apparatus for projecting moving three-dimensional images within a three-dimensional viewing space is disclosed herein. The wiremap projector apparatus includes an array of wires disposed within a three-dimensional viewing space defined between a first and second sheet. A digital projector is positioned with respect to said array of wires such that the projector projects multiple lighted pixel lines onto the array of wires to display a moving three-dimensional image within the three-dimensional viewing space. A position control actuator includes an actuating force means for moving the one or more wires, and a position controller generates and sends a position control signal to the position control actuator. The position controller generates the position control signal from image data processed by the projector to project multiple lighted pixel lines onto the array of wires to display a moving three-dimensional image within the three-dimensional viewing space.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention. Furthermore, when used and unless otherwise stated, terms such as "horizontal," "vertical," "upper," "lower," "front," "rear," "over," and "under," and similar position related terms are not to be construed as limiting the invention to a particular orientation. Instead, such terms are to be construed only on a relative basis reflecting the relative position and orientation of the various components shown in the accompanying depicted embodiments.

The present invention is directed to an improved method, system, and computer program for improving the image quality of a moving image rendered using wiremapping projection techniques. A three-dimensional (3-D) wiremap projector can project a moving image within a volume. The wires in the volume are used in place of a projector screen. Known wiremapping configurations use fixed wires across the volume. The invention provides a mechanism for the wires to move within the volume. The advantage is that as pixels within a movie move across the screen, the wires can move at the same rate, increasing the illusion of substance within the 3-D projections.

Figure 1:
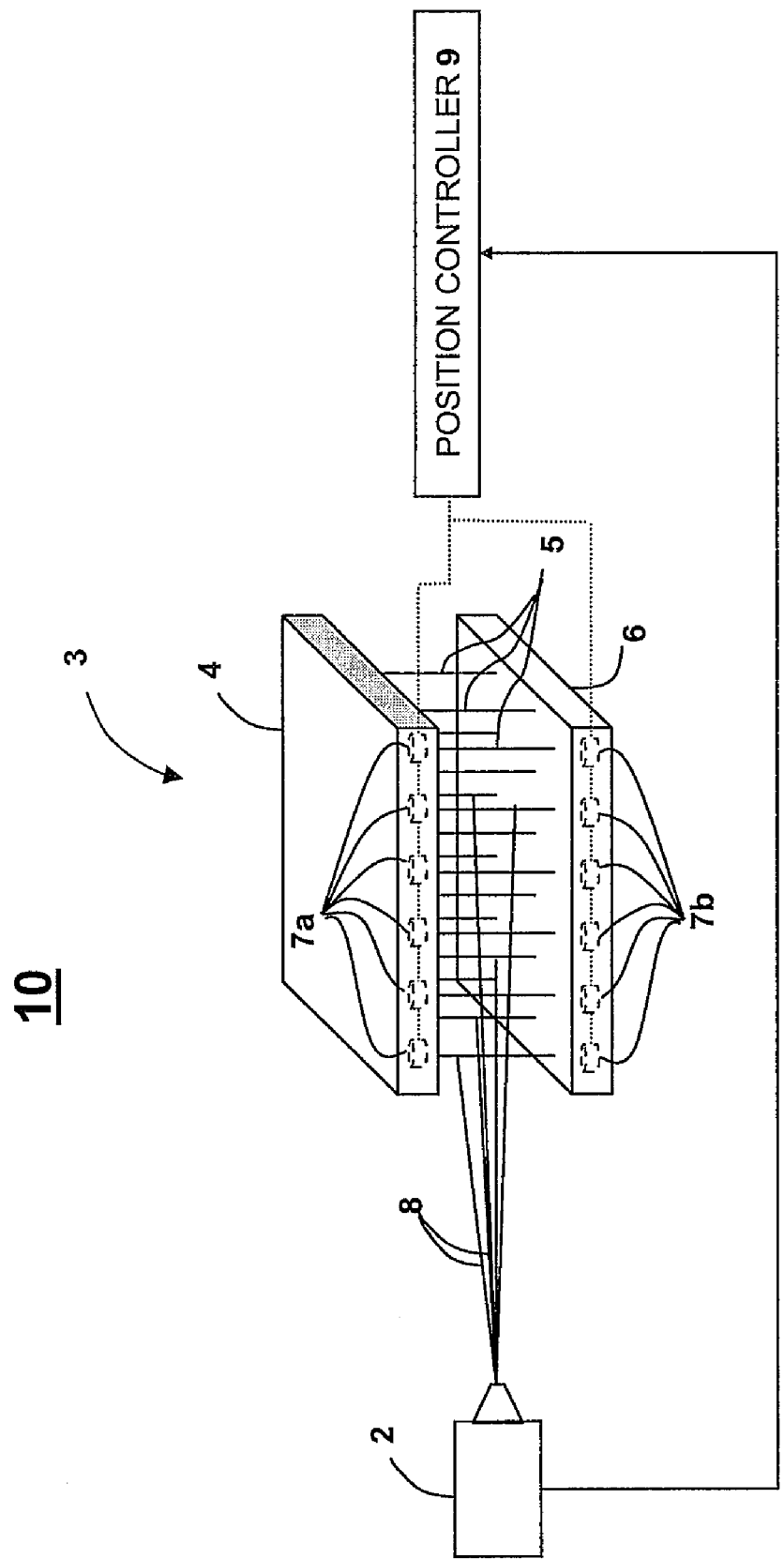
FIG. 1 is a high-level component diagram illustrating structural features of a 3-D projector apparatus in accordance with one embodiment of the present invention.
Figure 2:
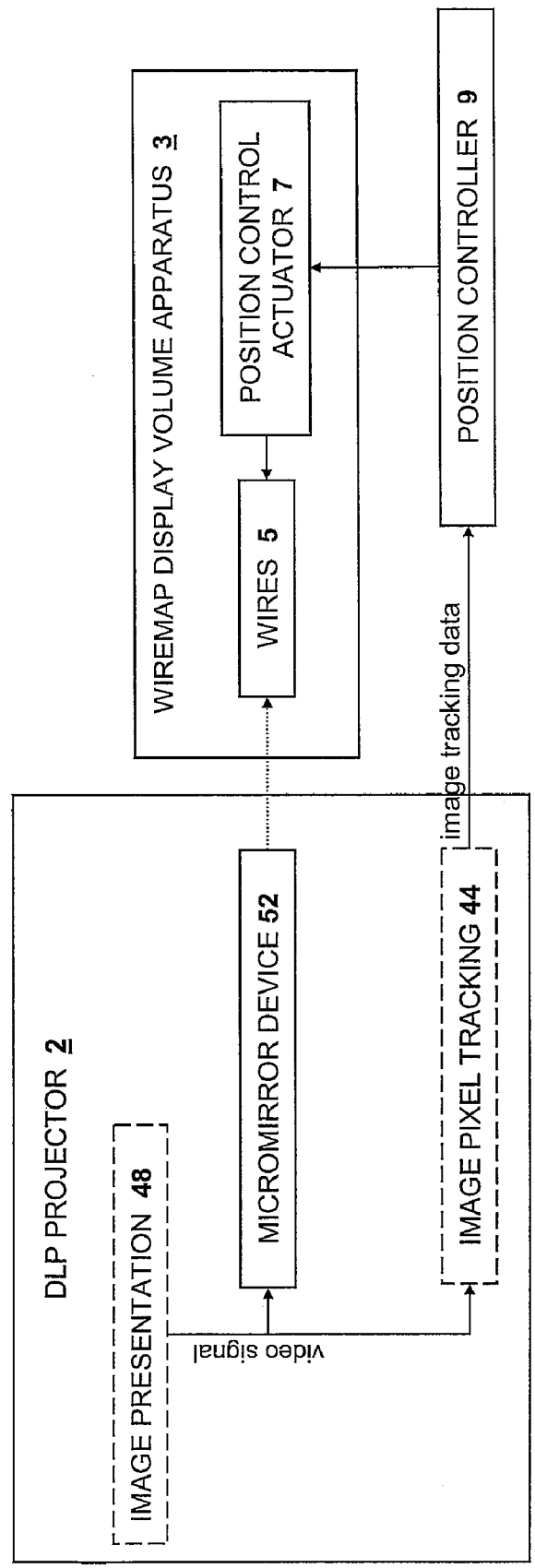
FIG. 2 is a high-level block diagram depicting the structural and logical features of a 3-D projector apparatus in accordance with the present invention.
Figure 3:
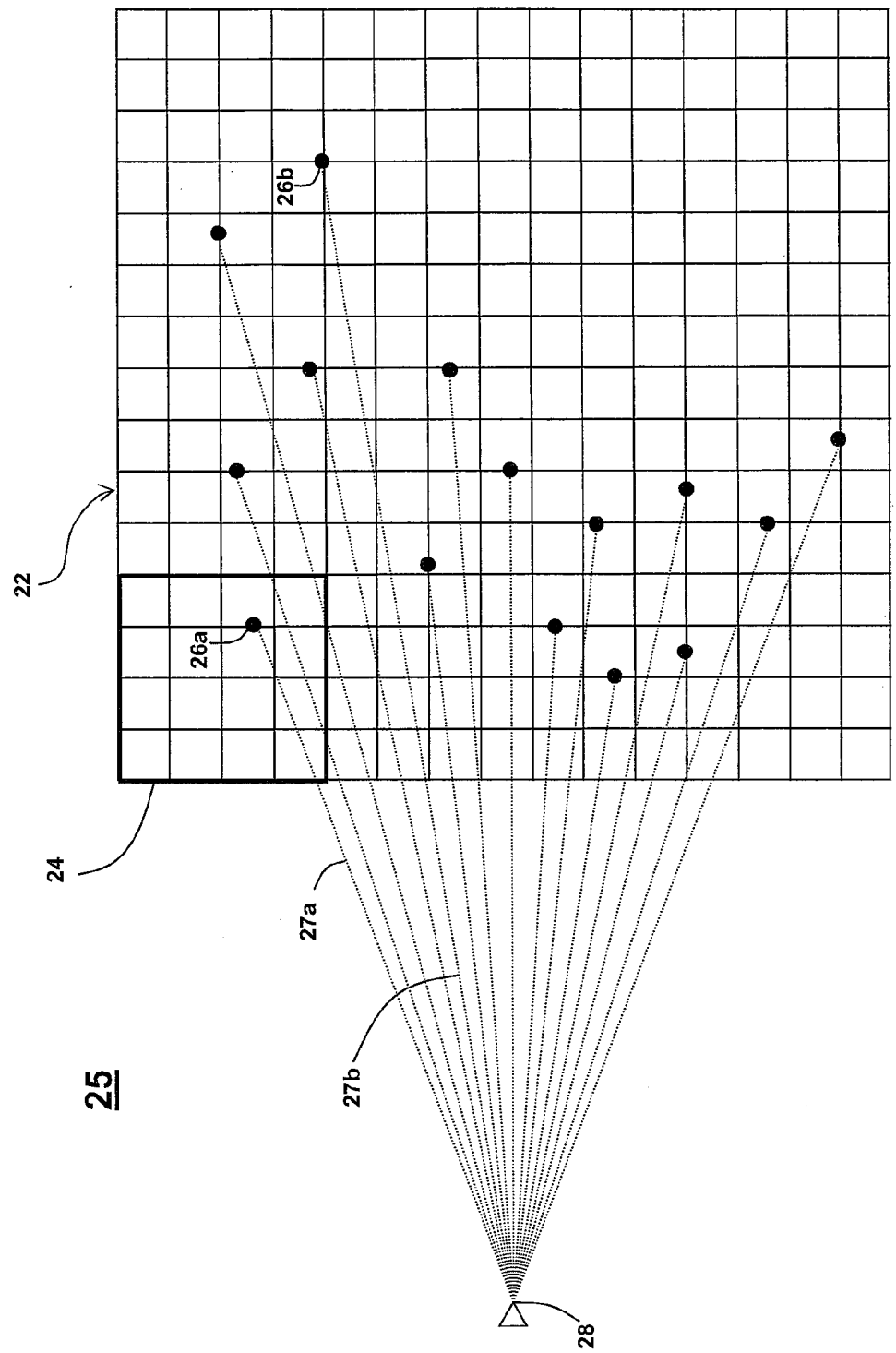
FIG. 3 depicts a 3-D projector apparatus configured in accordance with one embodiment of the present invention.

With reference now to the figures, wherein like reference numerals refer to like and corresponding parts throughout, and in particular with reference to FIGS. 1 and 2, component and block diagram representations of a 3-D projector apparatus 10 are depicted. FIG. 1 is a high-level component diagram and FIG. 2 is a high-level block diagram illustrating structural and functional features of 3-D projector apparatus 10 in accordance with one embodiment of the present invention. As shown in FIGS. 1 and 2, 3-D projector apparatus 10 generally comprises a projector 2, a display volume apparatus 3, and a position controller 9. Collectively, projector 2, display volume apparatus 3, and position controller 9 include structural and functional features that cooperatively enable a moving visual image projected from projector 2 to be displayed in a dynamically adjustable manner in three dimensions.

Projector 2 is a digital video projector that translates an input video signal into a corresponding visually perceptible image on a projection screen. Projector 2 preferably includes various data reading/processing modules contained within an image presentation module 48 that process an input video signal, such as may be read from a computer-readable medium such as a magnetic or optical data storage medium. Projector 2 further includes a lens and light system to project a lighted image corresponding to the processing image data at a sufficient pixel resolution and at a sufficient frame speed to be perceived by a human viewer as a moving image. In preferred embodiments, projector 2 may be a liquid crystal diode (LCD) or digital light processing (DLP) type projector.

In the embodiment shown in FIG. 2, and assuming projector 2 is a DLP-type digital projector, the light projection components further include a micromirror device 52 that directs individual, pixilized light beams or pixels onto respective ones of wires 5. The light pixels are encoded in accordance with a video signal from image presentation module 48. The light pixels are transmitted at respective radial angles from a focal point (shown in FIGS. 3 and 4).

The type and quality of the projector characteristics of projector 2 plays a key role in determining the quality of image projection. Traditionally, a projector such as projector 2 transmits a video image in a pixilated manner onto a substantially flat projection screen. Video data adapted for such 2-D viewing includes encoded 3-D visualization features such as depth of perception, shading, angling, etc. used to portray 3-D information on a 2-D screen.

The present invention employs a newly developing image projection technique in which 3-D video information is projected onto a 3-D display media. Specifically, and as depicted in FIGS. 1 and 2, projector 2 projects image data via pixilated light beams 8 transmitted onto display volume apparatus 3 which provides an adaptive 3-D display medium. Display volume apparatus 3 comprises an array of wires 5 that are extended between and substantially normal to a first plane formed by an upper sheet 4 and a second plane formed by a lower sheet 6. Upper sheet 4 and lower sheet 6 are preferably a substantially rigid sheet members having substantially parallel disposition planes such that a 3-D display volume containing the array of wires 5 is defined therebetween. In conventional 3-D wiremap displays, the wire array is static. In such systems, each of the wires within the array are arranged in a two-dimensional (2-D) array at fixed positions over a 2-D area such that respective ones of wires are aligned with one or more light pixels.

The present invention departs from the prior art in one aspect by adaptively moving the wires within the display volume in accordance with image data information to provide improved resolution and image-following which enhances the resultant 3-D display effect. To this end, display volume apparatus 3 further includes multiple position control actuators 7a on or within upper sheet 4. A set of corresponding position control actuators 7b reside on or within lower sheet 6. Each of position control actuators 7a is disposed in opposed alignment with an opposing one or position control actuators 7b with each opposing actuator coupled to opposing ends of a respective one of wires 5. In this manner, each of the array of wires 5 has its ends coupled to each of a pair of the position control actuators 7. While the presently disclosed position control actuators 7 use a bilateral mechanism on both ends of wires 5, it should be noted that alternative position control actuators may couple only to one end of each wire without departing from the spirit or scope of the present invention.

Position control actuators 7 include actuating force means for moving each of the aligned pairs so that each of the wires 5 may be independently moved to different positions within the display volume between upper and lower sheets 4 and 6. Position control actuators 7 may comprise one or more of many possible mechanical actuation means such as tracks and wheels or other mechanical conveyances. In an alternate embodiment, position control actuators 7 may comprise ferromagnetic or other electromagnetically influenced slider members together with electromagnets that cooperatively form a mechanical force inducing means that may be used to move wires 5 within the display volume.

In accordance with the embodiment shown in FIGS. 1 and 2, position control actuators 7 are communicatively coupled to a position controller module 9 that is also communicatively coupled to projector 2. Position controller module 9 includes circuit and/or logic, processing, and instruction means for generating one or more position control signals that are individually specified for each of one or more of the wires and are sent to the corresponding position control actuators 7 for positioning the wires within the 3-D viewing space. To coordinate the wire positions dynamically in accordance with visual features conveyed by the projected image, position controller 9 generates the position control signal from image data processed by projector 2 in relation to the projected image. Namely, and as shown in FIG. 2, projector 2 farther includes an image pixel tracking module 44 that processes the video signal projected by micromirror device to generate an image tracking signal received by position controller 9. Position controller 9 processes the image tracking data from image pixel tracking module 44 to adjust the positions of the wires 5 adaptively in accordance with changing image presentation details as now explained in further detail with reference to alternative embodiments shown in FIGS. 3 and 4.

FIG. 3 depicts an overhead view of the arrangement of display wires within a 3-D display volume in accordance with one embodiment of the present invention. As shown in FIG. 3, a representative lighted projected image signal originates from a projection focal point 28 and is projected radially therefrom as multiple light pixels including representative light pixels 27a and 27b. In the depicted overhead view, the 2-D area over which the wire array is distributed is represented by a wire placement grid 22.

As further depicted in the representative overhead view, multiple wires, including representative wires 26a and 26b, are positioned at various positions within wire placement grid 22. In accordance with the depicted embodiment, a position controller such as position controller 9 generates a position control signal that is processed by wire position control actuators such as actuators 7 to position the wires at specified positions on the depicted grid lines within wire placement grid 22. As shown in FIG. 3, the depicted wire placement results in each of the wires intercepting and reflecting the light from each of one or more respective light pixels. In a further embodiment, each of the wires has a specified position boundary within which position controller 9 may position. In the depicted embodiment, for example, a position controller in cooperation with position control actuation means may position wire 26a along the grid line points within and only within a position boundary 24 depicted as a 4×4 sub-grid within wire placement grid 22.

Figure 4:
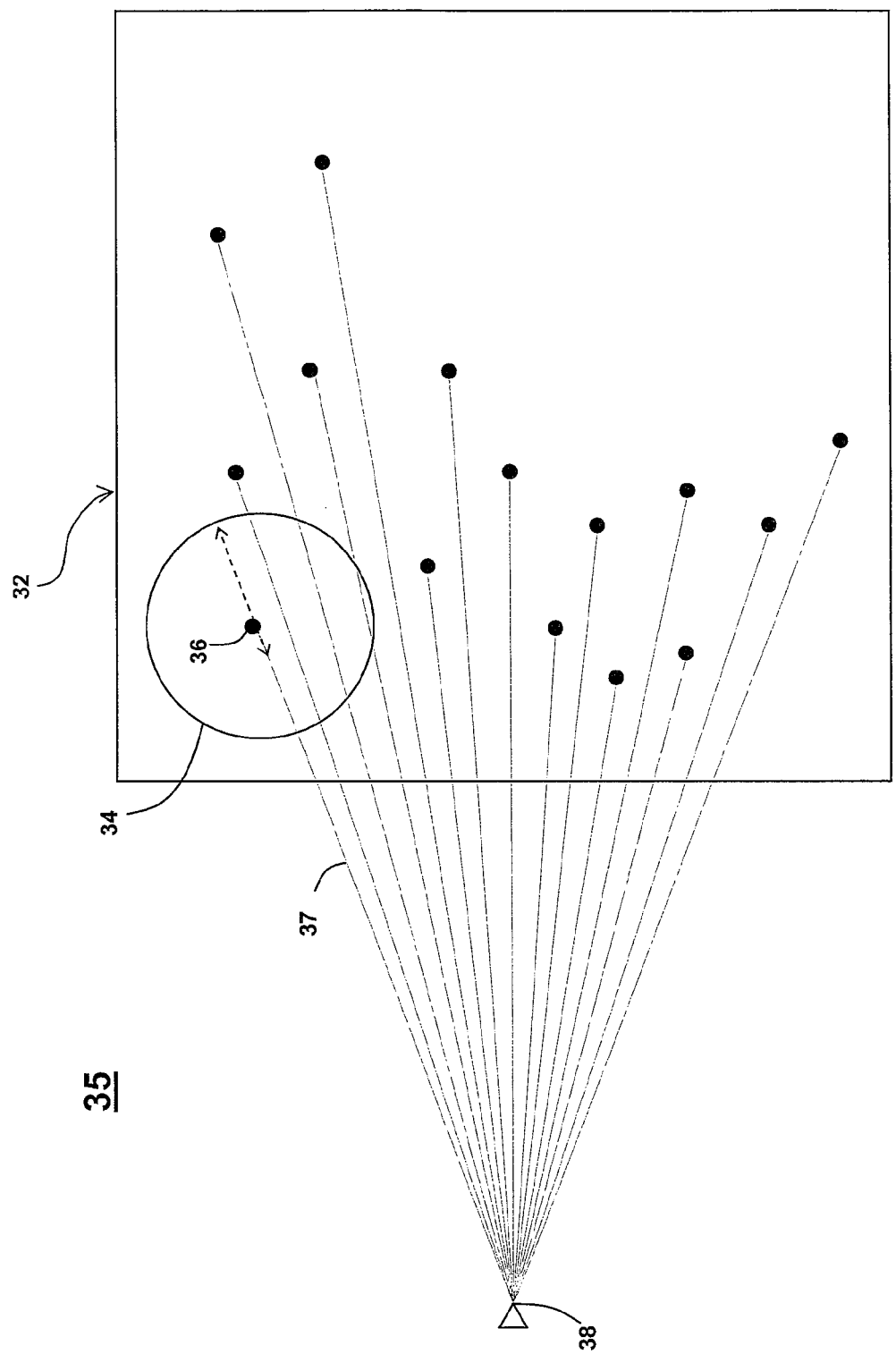
FIG. 4 depicts a 3-D projector apparatus configured in accordance with an alternate embodiment of the present invention.

FIG. 4 depicts an overhead view of the arrangement of display wires within a 3-D display volume in accordance with an alternate embodiment of the present invention. As shown in FIG. 4, a representative lighted projected image signal originates from a projection focal point 38 and is projected radially therefrom as multiple light pixels including representative light pixel 37. In the depicted overhead view, the 2-D area over which the wire array is distributed is represented by a wire placement area 32.

Similar to the embodiment shown in FIG. 3, multiple wires, including representative wire 36, are positioned at various positions within wire placement area 32, and a position controller such as position controller 9 generates a position control signal that is processed by wire position control actuators such as actuators 7 to position the wires. However, in accordance with the embodiment shown in FIG. 4, each of the wires has a specified position boundary that is not grid-like (i.e. rectangular) but is instead curvilinear. In the depicted embodiment, for example, a position controller in cooperation with position control actuation means may position wire 36 at points within and only within a circular position boundary 24 depicted as a 4×4 sub-grid within wire placement grid 22. In this manner the wires have greater flexibility of angular movement and may therefore more effectively track image data projected from focal point 38.

In the embodiments shown in FIGS. 3 and 4 it is contemplated that position controller 9 issues signals to position control actuator 7 for moving the wires to various positions in a fixed manner or a dynamic manner that follows corresponding image data received from the projector. In an alternative embodiment, position controller 9 and position control actuator 7 combine to form a vibration inducing mechanism in which position control actuator 7 vibrates its corresponding wire in accordance with a signal from position controller 9. In this embodiment the vibration is commenced and adjusted, such as by adjusting the vibration frequency in accordance with image tracking data received from image pixel tracking module 44.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A wiremap projector apparatus for projecting moving three-dimensional images within a three-dimensional viewing space, said wiremap projector apparatus comprising:

an array of wires disposed between and substantially normal to a first plane and a second plane, wherein said first plane is defined by a first sheet and said second plane is defined by a second sheet that is substantially parallel to said first sheet such that a three-dimensional viewing space containing said array of wires is defined between said first and second sheets;

a digital projector positioned with respect to said array of wires such that said digital projector projects multiple lighted pixel lines onto said array of wires to display a moving three-dimensional image within the three-dimensional viewing space;

a position control actuator in communicative contact with one or more of said array of wires, said position control actuator including an actuating force means for moving the one or more wires; and an electronic position controller that generates a position control signal and sends the position control signal to said position control actuator for positioning one or more of said array of wires to specified positions within said three-dimensional viewing space, wherein said electronic position controller generates the position control signal from image data processed by said digital projector to project multiple lighted pixel lines onto said array of wires to display a moving three-dimensional image within the three-dimensional viewing space.

2. The wiremap projector apparatus of claim 1, wherein said electronic position controller generates a position control signal that directs said position control actuator to linearly translate one or more of said array of wires within said three-dimensional viewing space.

3. The wiremap projector apparatus of claim 1, wherein said electronic position controller generates a position control signal that directs said position control actuator to induce a vibration into one or more of said array of wires within said three-dimensional viewing space.

4. The wiremap projector apparatus of claim 1, wherein said projector apparatus is a digital light processing projector comprising a micromirror device for projecting a video signal.

5. The wiremap projector apparatus of claim 1, wherein said projector apparatus includes an image pixel tracking module that processes the video signal projected by micromirror device to generate an image tracking signal received by said position controller, wherein said position controller processes the image tracking data from said image pixel tracking module to adjust the positions of the wires adaptively in accordance with changing image presentation details.

* * * * *